(12) United States Patent
Forschler et al.

(10) Patent No.: US 6,490,805 B1
(45) Date of Patent: Dec. 10, 2002

(54) BORE GAGE HEAD ASSEMBLY

(75) Inventors: Stephen Forschler, Clinton Corners, NY (US); Joseph Couture, Dover Plains, NY (US)

(73) Assignee: Utvecklings AB Uranienburg, Naeka Strand (SE)

( * ) Notice: Subject to any disclaimer, the term of this patent is extended or adjusted under 35 U.S.C. 154(b) by 0 days.

(21) Appl. No.: 09/702,403

(22) Filed: Oct. 31, 2000

(51) Int. Cl.[7] ............................. G01B 5/00; G01B 3/00
(52) U.S. Cl. ..................................... 33/542; 33/555.1
(58) Field of Search ....................... 33/542, 543, 544.4, 33/555.1, 555.2

(56) References Cited

U.S. PATENT DOCUMENTS

| 2,095,405 A | | 10/1937 | Aldeborgh et al. | |
|---|---|---|---|---|
| 2,253,803 A | * | 8/1941 | Newberry | 33/542 |
| 2,429,511 A | | 10/1947 | Emery | |
| 2,435,949 A | * | 2/1948 | Worthen | 33/542 |
| 2,443,880 A | | 6/1948 | Aldeborgh et al. | |
| 2,443,881 A | | 6/1948 | Aldeborgh et al. | |
| 2,547,364 A | | 4/1951 | Boat | |
| 2,566,970 A | * | 9/1951 | Swensson | 33/542 |
| 2,587,099 A | | 2/1952 | Bishop et al. | |
| 2,601,496 A | | 6/1952 | Boat | |
| 3,026,622 A | * | 3/1962 | Croshier et al. | 33/542 |
| 3,352,021 A | * | 11/1967 | Leach et al. | 33/542 |
| 3,384,969 A | * | 5/1968 | Eisele | 33/542 |
| 3,406,459 A | * | 10/1968 | Sorensen | 33/542 |
| 4,045,877 A | | 9/1977 | Rutter | |
| 4,146,968 A | * | 4/1979 | Tovey | 33/178 R |
| 4,419,829 A | | 12/1983 | Miller | |
| 4,419,830 A | | 12/1983 | Miller | |
| 4,843,722 A | * | 7/1989 | Sattman | 33/544 |
| 5,848,479 A | * | 12/1998 | MacIndoe | 33/542 |

OTHER PUBLICATIONS

H.–J. Warnecke and W. Dutschke: "Fertigungsmesstechnik Handbuch für Industrie und Wissenschaft, Seiten 216–218" 1984, Springer Verlag, Berlin and More (DE) XP002191854 p. 217; figures 6.3C,D.

* cited by examiner

Primary Examiner—Diego Gutierrez
Assistant Examiner—Mirellys Jagan
(74) Attorney, Agent, or Firm—Wolf, Greenfield & Sacks, P.C.

(57) ABSTRACT

A bore gage for comparing interior dimensions of a bore with a master. The bore gage includes a pivot mechanism containing centralizer contacts, and a pivotally mounted lever containing a sensitive contact, which, in conjunction with a reference contact, compares the interior surface dimension of a bore. Both the lever and the pivot mechanism containing the centralizer contacts are mounted in an exposed position on the bore gage head to allow easy cleaning, maintenance and repair thereof. The pivot mechanism includes a member that extends around the bore gage head. An associated adjustable stop limits movement of the centralizer contacts. The gage unit, an extension housing and the head may all be readily separated from one another for cleaning and maintenance.

21 Claims, 4 Drawing Sheets

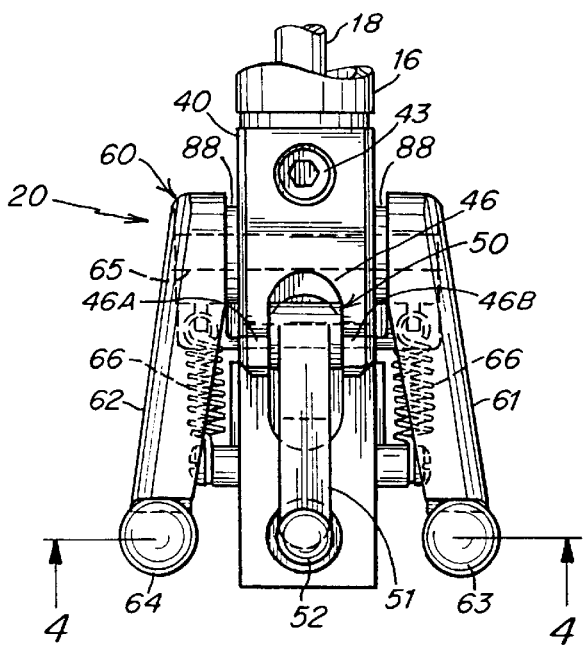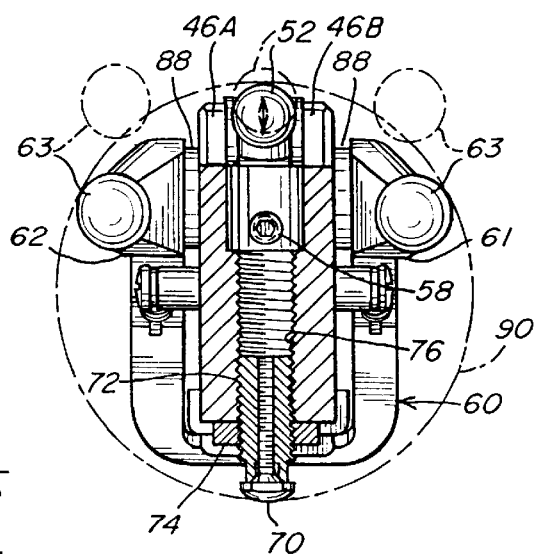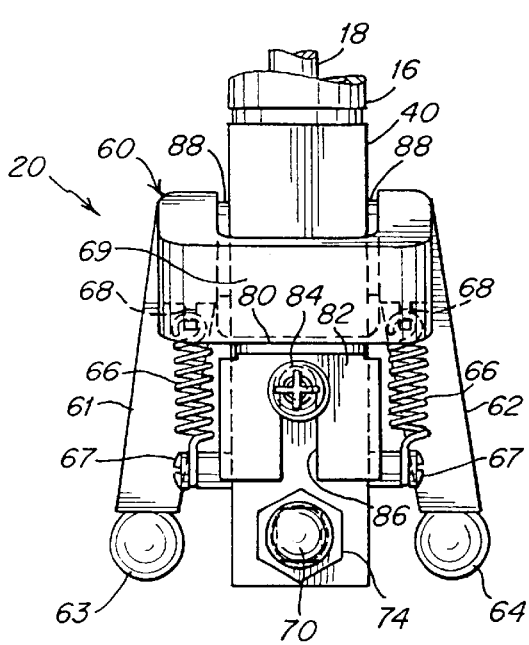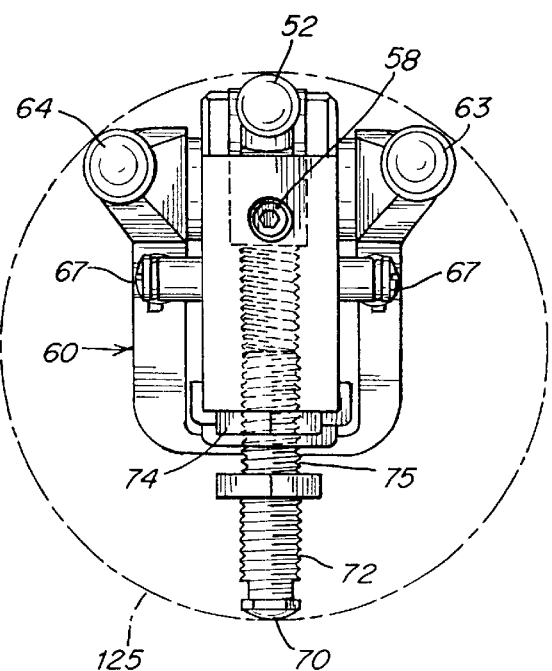

BORE GAGE HEAD ASSEMBLY

FIELD OF THE INVENTION

This invention relates generally to measuring instruments, and more particularly to an improved head assembly for a gage for comparing the inside diameter of a bore.

DESCRIPTION OF RELATED ART

A bore gage is an instrument designed to compare the inside diameter of a cylindrical bore formed in a workpiece with a master ring. A machinist who drills or cuts a bore in a workpiece will normally perform frequent precise measurements of the diameter of the bore to insure that the finished diameter corresponds precisely with the specified diameter. While calipers may be used for this purpose, bore gages are more convenient, quicker and oftentimes more precise.

A typical bore gage includes a head having a pair of angularly disposed centralizing contacts, one contact on either side of a center line disposed perpendicular to the longitudinal axis of the instrument. At one end of the center line is an extensible stem, and at the opposite end of the center line is a sensing contact. The matched pair of centralizing contacts, and the stem locate the bore gage head assembly along the center line of the bore to be checked so that the center line of the head assembly is positioned exactly along the center line of the bore, rather than a chord. In that position, the sensing contact, which is permitted to move within a limited range of motion, makes a measurement precisely at the diameter of the bore. The sensing contact is operatively connected to a mechanism which drives a dial indicator, LVDT amplifier or the like. In one type of bore gage, the sensing contact transmits its motion to a right angle transfer mechanism which in turn transmits that motion via a 1:1 ratio to a dial indicator or LVDT amplifier. Such a bore gage is usually set to a ring standard of known size. The deviation from that standard is then displayed on the dial indicator, an LVDT amplifier or the like.

In one type of bore gage, the centralizing contacts and the sensing contact are disposed on the ends of associated plungers that are disposed on the head assembly with a very precise slip fit. Both the centralizing contact plungers and the sensing contact plungers move in a direction parallel to their direction of elongation or parallel to their central axes. Typically, the clearance between the outside diameter of each plunger and the mating inside diameter of the plunger bore in the head assembly is 0.0003 inches to 0.0007 inches. Because of this very small clearance, any coolant, grit or chips that are left in the cylindrical bore being measured potentially work their way into the plunger mechanisms and inhibit the smooth motion of the plungers. Because the smooth motion of all of these plungers is absolutely essential for accurate bore diameter measurement, the presence of any such contaminants could have a severe impact on measurement accuracy. This problem has been compounded by a general industry trend toward water-based coolants as opposed to oil-based coolants used in the machining of the bores to be measured. Water-based coolants tend to have a corrosive effect on the steel plungers of the head assembly. Also, water-based coolants tend to leave a gummy residue on the plungers, which adversely affects the otherwise smooth motion thereof. While the bore a gage head assemblies can be disassembled and cleaned, this cleaning process is relatively time-consuming, and it results in downtime for the bore gages and lost worker time.

Examples of prior art mechanisms in which centralizing contacts and the sensing contact are mounted on plungers are described in U.S. Pat. Nos. 2,095,405; 2,547,364; 2,587,099; 2,601,496; 2,443,881; 2,443,880; and 2,429,511. Other patents that relate to bore gages that do not have plunger mechanisms include U.S. Pat. Nos. 4,419,829; 4,419,830; and 4,045,877.

SUMMARY OF THE INVENTION

The foregoing drawbacks of prior art bore gages using plungers are overcome by the present invention, which includes, in one aspect, two centralizing contacts disposed on an externally mounted pivot mechanism which is attached to the bore gage head by a single pivot.

In another aspect of the invention, the sensing contact and the mechanism for transferring the motion of the sensing contact to the plunger for operating the dial indicator or LVDT amplifier are combined into a single lever-type unit pivotally mounted on the bore gage head assembly. The sensing contact is disposed between the two centralizing contacts and is pivotable about a different axis.

In another aspect of the invention, the centralizing contacts, and the sensing contact have mechanisms which are exposed and may be readily cleaned without disassembly.

In a preferred embodiment, cutouts are provided on the sides of the bore gage head assembly to allow access to the mechanism for the sensing contact by a solvent or the like to permit rinsing and cleaning thereof without disassembly. The cutouts also permit an air stream from a pressurized air hose to be applied directly to the point at which the sensing contact mechanism engages the bottom of the plunger for operating the indicator. In another aspect, springs that bias the centralizing mechanism are external to the bore gage head assembly and therefore are easily replaced, cleaned and serviced.

In yet another further aspect of the invention, a set screw is provided in the head assembly which allows adjustment of the sensing contact measuring range. The set screw restricts the travel of the lever unit to the desired range.

In yet another further aspect of the invention, an external stop is disposed on the bore gage head assembly which cooperates with the pivot mechanism to limit movement of the centralizing contacts.

In yet another further aspect of the invention, the bottom bushing for the extension plunger for operating the indicator unit is spaced from the contact point with the sensing contact mechanism a sufficient distance to prevent coolant and debris from adversely affecting movement of the extension plunger.

In yet another further aspect of the invention, the sensing contact and the centralizing contacts comprise tungsten carbide balls.

In an alternative embodiment of the present invention, a hand operated mechanism is provided for retracting the centralizing contacts during entry of the head assembly into a bore to be measured.

As a consequence of the foregoing features, the bore gage of the present invention may be readily cleaned and repaired without extensive disassembly to permit smooth motion of all the elements essential for an accurate bore measurement.

BRIEF DESCRIPTION OF THE DRAWINGS

The objects, advantages and features of this invention will be more clearly appreciated from the following detailed description, when taken in conjunction with the accompanying drawings, in which:

FIG. 3 is a front, elevation view of the head of the bore gage of FIG. 1 as seen along the line 3—3 of FIG. 2;

FIG. 4 is a cross-sectional, bottom view of the head of the bore gage of FIG. 1 taken along the line 4—4 of FIG. 3 illustrating use of the bore gage for measuring a small bore;

FIG. 5 is a rear, elevation view of the head of the bore gage of FIG. 1 as seen along line 5—5 of FIG. 2;

FIG. 6 is a bottom plan view of the head of the bore gage of FIG. 1 illustrating use of the bore gage with a master ring;

DETAILED DESCRIPTION

Figures 1, 2:
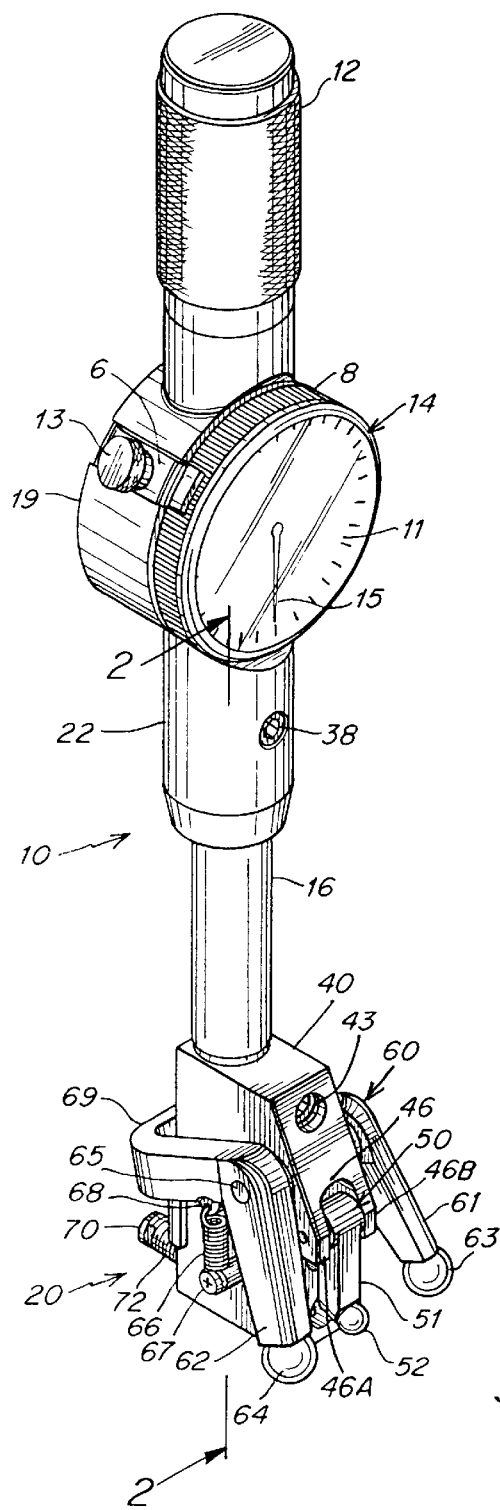
FIG. 1 is a perspective view of the bore gage of the present invention.
FIG. 2 is a fragmentary, cross-sectional, side view of the bore gage of FIG. 1 taken along the line 2—2 of FIG. 1.
Figure 7:
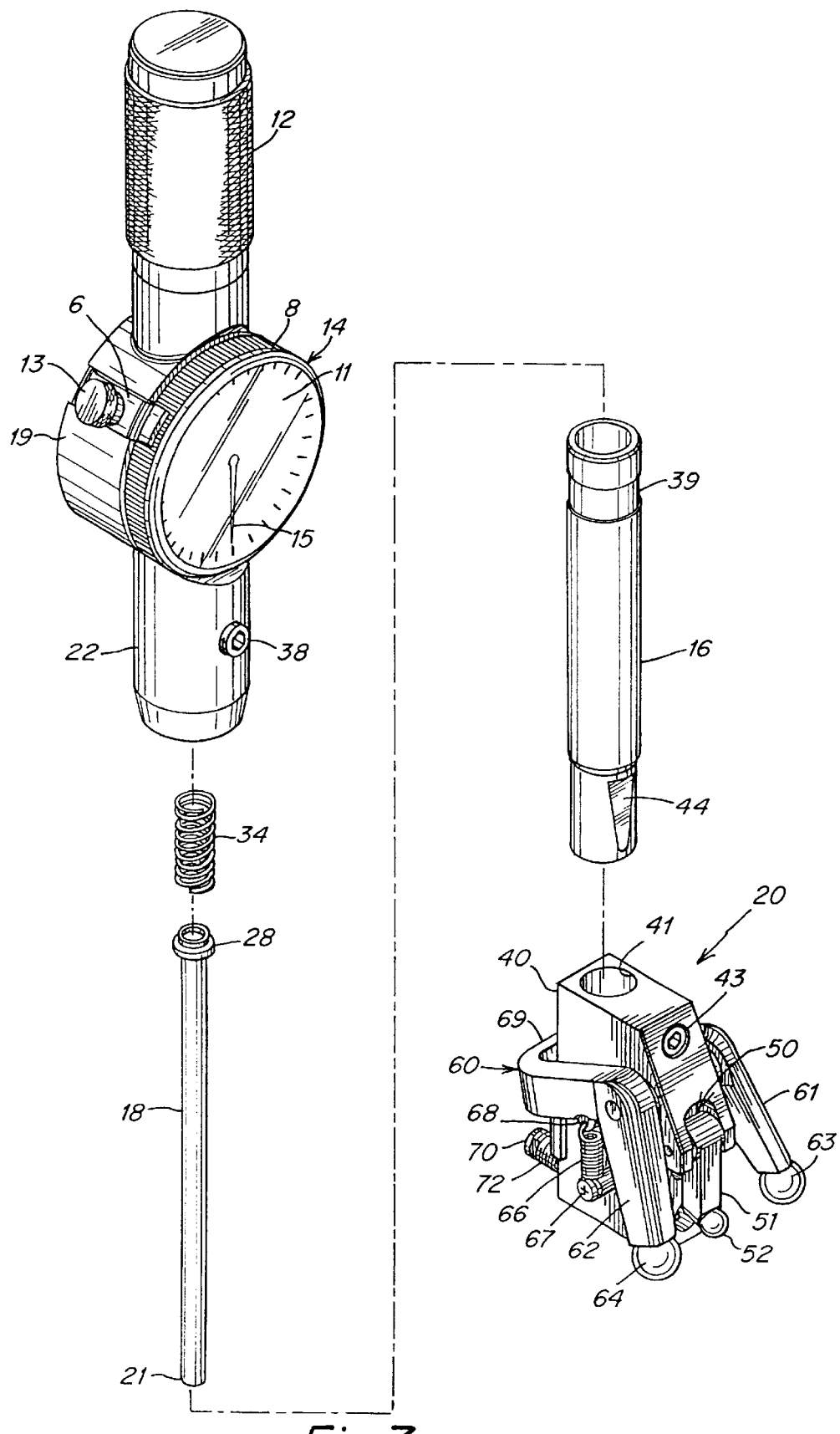
FIG. 7 is an exploded, perspective view of the bore gage of FIG. 1.

With particular reference to FIGS. 1 and 7, a preferred embodiment of the bore gage of this invention will now be described. Bore gage 10 includes handle 12, indicator unit 14, extension housing 16 and bore gage head 20.

Handle 12 preferably includes a knurled surface for grasping by the user. If desired, handle 12 may be threadably mounted onto unit 14 for easy removal.

Indicator unit 14 is conventional and is well known to those of ordinary skill in the art. Unit 14 may be a dial indicator, an LVDT amplifier or the like. In a preferred embodiment, indicator unit 14 is a dial indicator that includes a housing 22 and bezel 8, an indicator surface 11 and a hand 15 pivotally mounted at one end at the center of indicator surface 11. Bezel 8 is locked in place on housing 22 by associated bracket 6 and screw 13. The outer perimeter of bezel 8 is roughened, to provide frictional engagement with bracket 6 to hold bezel 8 in position. Release of pressure applied by bracket 6 to bezel 8 by loosening of screw 13 allows bezel 8 and indicator surface 11 to be rotated into a desired orientation, and/or removed. Indicator surface 11 includes a plurality of markings displayed about its outer circumference, which, with hand 15, provide a visual indication of the bore size.

Indicator unit 14 is coupled to head 20 by extension housing 16. Preferably, a cylindrical housing 22 on unit 14 surrounds and protects the upper end of extension housing 16, as illustrated in FIG. 2. The upper end of housing 16 engages shoulders 17 in housing 22. Typically, an O-ring seal 36 or the like is disposed on the lower end of housing 22 to prevent contaminants, whether in liquid or solid form, from entering the interior of extension housing 16 or housing 22. In a preferred embodiment, housing 22 is affixed to extension housing 16 by a set screw 38, or the like. It will be understood, of course, that other means for attaching housing 22 to extension housing 16 may be used. Set screw 38 extends through housing 22 to engage an outer surface of extension housing 16. Preferably, a cutout 39 is disposed on the outer surface of the upper end of extension housing 16 and is precisely aligned with set screw 38, so that the tip of set screw 38 resides within cutout 39 when fully engaging the outer surface of extension housing 16. In this way, movement of extension housing 16 axially toward or away from unit 14 is prevented. The use of a set screw 38 permits extension housing 16 to be quickly and easily removed from housing 22, should it be desired to replace unit 14, or should it be desired to clean or replace the moving parts.

Extension plunger 18 extends longitudinally or axially through extension housing 16 and into the lower end of indicator housing 19, as illustrated in FIG. 2. Extension plunger 18 travels within housing 16 in a direction generally parallel to its direction of elongation, or in an axial direction. Extension plunger 18 passes through bushings 24 and 26 within extension housing 16. Bushings 24 and 26 align and guide plunger 18. Preferably, bushing 24 is disposed sufficiently far from head 20 that it is not contaminated by any dirt or the like on head 20 or on the lower, distal end of plunger 18 resulting from a measuring operation. As a result, extension plunger 18 moves freely through bushing 24 without fear of binding due to contaminants.

Disposed on the upper, proximal end of extension plunger 18 is a flange 28.

Disposed above the upper end of extension plunger 18 is a contact point 30 which extends through bushing 32 and into housing 22 and which is mechanically coupled by conventional means located in unit 14 to hand 15 to cause hand 15 to pivot in response to axial movement of extension plunger 18. Preferably, housing 22 and housing 16 are positioned so that the lower end of contact point 30 is spaced about 0.005" to 0.015" above the upper end of extension plunger 18 when plunger 18 is at rest. Construction and operation of unit 14 and the coupling of contact point 30 to hand 15 are well known to those of ordinary skill in the art, and will not be described further. Disposed between bushing 32 and flange 28 and surrounding contact point 30 is a compression spring 34. Compression spring 34 urges extension plunger 18 axially downwardly toward head 20, as will be described.

Head 20 will now be described with particular reference to FIGS. 2, 3 and 5. Head 20 includes a housing 40, a lever mechanism 50 pivotally mounted on housing 40, a pivot mechanism 60 also pivotally mounted on housing 40, and reference contact 70.

Housing 40 preferably is formed of a unitary construction and from a metal, such as chrome plated aluminum or the like, which is suitably durable and provides the desired strength and resistance to corrosion. However, it is to be understood that housing 40 need not be formed of stainless steel, and need not be unitary in construction, so long as it functions as described. Housing 40 includes an upper channel 41 structured to receive a lower end of extension housing 16 in a tightly fitting relationship. Channel 41 has been machined to provide shoulders 42 upon which the lower end of extension housing 16 rests. Preferably, extension housing 16 is held in place on housing 40 by a set screw 43 or the like which allows rapid and easy separation of housing 40 from extension housing 16 for cleaning, repair or replacement. Preferably, the tip of set screw 43 resides in a cutout 44 disposed in the lower end of extension housing 16 to prevent axial movement of extension housing 16 with respect to housing 40 and to ensure a precisely maintained relationship between the two, and between head 20 and unit 14.

Housing 40 includes two diametrically opposed work engaging elements, reference contact 70 and sensitive contact 52. Sensitive contact 52 and reference contact 70 engage opposite sides of a diameter of an interior surface to be gaged, as will be described. Reference contact 70 is carried on a threaded member 72 which is threadably mounted in a correspondingly threaded hole 76 in housing 40. The position of reference contact 70 is adjusted by threading member 72 into or out of housing 40 and thereafter locking the axial position of threaded member 72 with a lock nut 74 or the like. Adjustment of member 72 adjusts the gage range (or range extension) of reference contact 70, which is important to the proper setting of the gage. It will be appreciated that threaded member 72 and associated reference contact 70 may be removed by simply unscrewing lock nut 74 and threaded member 72 and removing them from housing 40. Typically, reference contact 70 is a round or semi-spherical member formed of a relatively hard, wear-resistant material, such as hardened tool steel, and is mounted in a socket provided therefor in the end of member 72. In a preferred embodiment, contact 70 is threaded into the socket. It is important that threaded member 72 be accurately maintained, since member 72 controls the location of extension housing 16, head 20 and reference contact 70 in a bore to be measured. The accuracy of the gage in large part depends upon the care and accuracy with which these parts are located.

Lever mechanism 50 includes angularly disposed arms 51 and 53. Lever mechanism 50 is pivotally mounted to housing 40 at a point generally equidistant from the distal ends of arms 51 and 53 at the junction of arms 51 and 53. Preferably, lever mechanism 50 is pivotally mounted in a yoke 46 formed in housing 40 about pivot pin 54, or the like, which extends through lever mechanism 50 and into arms 46A and 46B of yoke 46. Sensitive contact 52 is mounted adjacent the distal end of arm 51 of lever mechanism 50 and is disposed substantially in opposed, diametric alignment with threaded member 72 and reference contact 70.

Disposed adjacent the distal end of arm 53 of mechanism 50 is a transfer contact 56. The lower end 21 of extension plunger 18 rests on contact 56 and is urged by spring 25 34 into constant engagement with transfer contact 56. This downwardly directed force urges lever mechanism 50 about pivot pin 54 in a counterclockwise direction, as shown in FIG. 2, to position sensitive contact 52 outwardly away from housing 40, at a location as far from housing 40 as is permitted by mechanism 50. Pivoting of lever mechanism 50 about pivot pin 54 therefore transfers substantially linear movement of contact 52 toward and away from housing 40 at right angles into axially directed, linear movement of extension plunger 18 within extension housing 16, toward and away from unit 14. Thus, in the present invention, the sensitive contact mechanism has been combined with the right angle transfer mechanism into a single unit.

In a preferred embodiment, both the transfer contact 56 and the sensitive contact 52 comprise tungsten carbide spheres, although balls of other equally durable and corrosion-resistant materials could be used. While a spherical shape is preferred for contacts 52 and 56, it will be appreciated by one of ordinary skill in the art that contacts 52 and 56 could be formed of some other shape, such as a hemisphere, a rounded configuration or even a substantially flat configuration, so long as the desired contact function is performed by contact 52, and so long as the right angle transfer function is performed by contact 56. Typically, contacts 52 and 56 are braized onto the distal ends of respective arms 51 and 53, although contacts 52 and 56 could be affixed by any other known means, such as epoxying, soldering or the like.

A set screw 58 extends from the underside of housing 40 to a position in which the tip of screw 58 engages the lower surface of arm 53 when mechanism 50 is not being deployed. The permitted range of movement of mechanism 50 and thus the range of measurement of sensitive contact 52 is controlled by set screw 58. Compression spring 34 urges extension plunger 18 downwardly against transfer contact 56 to pivot mechanism 50, thereby urging the lower surface of arm 53 into contact with the tip of set screw 58. If set screw 58 is withdrawn from housing 40, sensitive contact 52 is pushed farther from housing 40 by spring 34, and lever mechanism is permitted a greater range within which to pivot, increasing the permissible range of measurement. Conversely, if set screw 58 is advanced into housing 40, lever mechanism 50 is permitted to pivot less, thereby positioning contact 52 closer to housing 40 and reducing the permissible range of measurement.

In another aspect, housing 40 may include a cutout 45 which preferably extends all the way through housing 40 to expose and permit access to the lower end of extension plunger 18 and transfer contact 56 by a cleaning solution, pressured air or the like, to permit cleaning repair, or replacement of contact 56 and mechanism 50.

Pivot mechanism 60 includes arms 61 and 62 disposed on opposite sides of housing 40. Each arm 61 and 62 carries a respective centralizer contact 63 and 64 on a distal end thereof. Centralizer contacts 63 and 64 are spaced from one another and are equally spaced from contact 52 on opposite sides thereof. Pivot mechanism 60 is pivotally mounted on housing 40 by a pivot pin 65 or the like which extends through the proximal end of each arm 61 and 62 and through housing 40. Centralizer contacts 63 and 64 replace the contact points mounted on plungers, as found in the prior art, and serve the same function as the prior art contact points, namely, to locate the head 20 along the center line of the bore to be gaged so that the central axis of the head 20 is positioned exactly along the center line of the bore. The pivotal mounting of mechanism 60 allows head 20 to accommodate bores of different sizes.

Preferably, mechanism 60 is biased into a position in which contacts 63 and 64 are pivoted outwardly to be disposed at a maximum permitted distance from housing 40, as shown in FIG. 1. This function is performed by a biasing mechanism which typically is at least one extension spring 66, and preferably two extension springs 66, one for each arm 61 and 62. In the embodiment illustrated in FIGS. 1 and 2, each spring 66 is attached to housing 40 such as by a threaded screw 67 and to pivot mechanism 60 at a point spaced from pivot pin 65 away from arms 61 and 62. If the biasing mechanism is a spring 66, in one embodiment, an end of each spring 66 is attached to mechanism 60 by means of a projection 68 having an opening through which an end of the spring extends.

In a preferred embodiment, pivot mechanism 60 includes a bracket member 69 that joins arms 61 and 62 at their proximal ends, typically adjacent pivot pin 65. Bracket member 69 preferably extends around the exterior of housing 40 on a side thereof opposite contact 52. Bracket member 69 assures that arms 61 and 62 and thus respective contacts 63 and 64 move in alignment and in unison. Preferably, projections 68 are disposed on member 69, and if two springs 66 are employed, each spring 66 is coupled to member 69 at the same distance from pivot pin 65 on a side of pivot pin 65 opposite contacts 63 and 64. Similarly, for two springs 66, each screw 67 is disposed on an opposite side of housing 40 at precisely the same distance from pivot 65.

In another aspect, an adjustable stop 80 may be provided on the back of housing 40 opposite contact 52. Stop 80 engages member 69 and thereby controls the angle through which pivot mechanism 60 can pivot, by controlling the distance between contacts 63 and 64 and housing 40 when gage 10 is not being deployed. As can be seen in FIG. 2, springs 66 pull downwardly on member 69, urging contacts 63 and 64 outwardly away from housing 40, and urging member 69 into contact with stop 80. Preferably, stop 80 is adjustable to allow adjustment of the distance of contacts 63 and 64 from housing 40. In one embodiment, stop 80 includes a bracket 82 with a slot 86 and screw 84. A head on screw 84, which is larger than the width of slot 86, holds bracket 82 onto housing 40. By loosening screw 84, bracket 82 may be moved either upwardly toward unit 14 to reduce the permitted range of pivotal motion of mechanism 60, or downwardly away from unit 14 to increase the permitted range of pivotal movement of mechanism 60. Screw 84 is then tightened when bracket 82 is in its desired location. It will be appreciated that other adjustable stops could be provided to perform the same function as bracket 82 and screw 84.

Preferably, contacts 63 and 64 are tungsten carbide spheres which are substantially identical to contact 52, although contacts 63 and 64 may be somewhat smaller in diameter than contact 52. Preferably, contacts 63 and 64 are epoxied onto the distal ends of respective arms 61 and 62, although they could be affixed by braizing or soldering or other like techniques. It is to be understood, that contacts 63 and 64 need not be spherical, but could be rounded or flat or hemispherical in shape. In addition, it is not necessary that contacts 63 and 64 be formed of tungsten carbide. Other suitably durable, hardened and corrosion-resistant materials could be used.

In a preferred embodiment, bushings 88 are provided about pivot pin 65 between arms 61 and 62 and corresponding, facing portions of housing 40. Bushings 88 provide for proper centralization and smoothness of motion of mechanism 60.

Gage 10 may be used with different sized bores simply by providing a threaded member 72 and reference contact 70 of a suitable length, by adjusting set screw 58 as previously discussed, and/or by adjusting the position of stop 80.

It will be appreciated that pivot mechanism 60 typically has a greater range of pivotal movement than lever mechanism 50. It is important that contacts 63 and 64 be capable of being withdrawn sufficiently by pivoting of mechanism 60 so that contact 52 engages the inside surface of the bore to provide a precise measurement.

While it is not necessary that movement of mechanism 60 be limited in a clockwise direction as shown in FIGS. 1 and 2, to withdraw arms 61 and 62 away from the interior surface of the walls of a bore, in one embodiment, member 69 limits the angle through which mechanism 60 may pivot in a clockwise direction because member 69 engages the back surface of housing 40 if it pivots through an angle which is greater than a certain amount in a clockwise direction. Thus, member 69 preferably is provided with a dimension such that it is spaced from the back surface of housing 40 a sufficient distance that the desired angle of pivotal movement of mechanism 60 is permitted, but not so great that arms 61 and 62 are permitted to engage biasing mechanism 66 or screw 67 as mechanism 60 pivots in a clockwise direction (FIG. 1 or 2). Therefore, typically, member 69 is spaced from the back surface of housing 40 a distance of about 0.065 inches.

An alternative embodiment of the bore gage 10 of this invention will now be described with particular reference to FIGS. 8 and 9. Like numbers are used for like parts, where applicable. The bore gage of FIGS. 8 and 9 includes a centralizer mechanism 100 structured to pivot mechanism 60 and thus contacts 63 and 64 toward housing 40 to retract contacts 63 and 64 away from the interior surface of a bore 90 during insertion of the gage 10 into a bore 90. In a preferred embodiment, centralizer mechanism 100 includes lever 102 and linkage 104. Lever 102 is typically mounted to unit 14 at location 108 on a face thereof opposite surface 11, although it is to be understood that lever 102 could be mounted at other locations on bore gage 10. Typically, lever 102 is pivotally mounted to unit 14 at location 108 such as by a screw, rivet or the like. A handle 106 is disposed on lever 102 in spaced relation with location 108. Handle 106 is structured for manual finger or thumb actuation. Linkage 104 is coupled to lever 102 at location 110, which is at a point between location 108 and handle 106, such as by a screw, rivet or the like which allows for pivotal movement of linkage 104 with respect to lever 102. A stop 112 also may be provided. Stop 112 typically includes a screw 114 or the like mounted to unit 14 which travels in a slot 116 in lever 102. Slot 116 is of a predetermined length to limit the angle of pivot of lever 102 about location 108.

Linkage 104 is also coupled to mechanism 60 such as by a screw 118, rivet or the like. Screw 118 allows for pivotal movement of linkage 104 with respect to mechanism 60. Screw 118 is positioned in spaced relation with respect to pivot pin 65 and so that projection 68 is between pivot pin 65 and screw 118. In this manner, raising of linkage 104 by pivoting lever 102 in a counterclockwise direction, as shown in FIG. 8, will raise member 69, against the bias of spring 66, causing pivoting of mechanism 60 in a clockwise direction, as shown in FIG. 9, producing withdrawal of contacts 63 and 64 toward housing 40.

In a preferred embodiment, linkage 104 includes a generally right angle bend 105 which allows linkage 104 to roughly parallel extension 16 along one lateral side so that linkage 104 does not interfere with use of the gage or its handling by the operator. Thus, linkage 104 is configured to be positioned close to the exterior of housing 16, but still is exposed for cleaning, repair or replacement.

Figure 8:
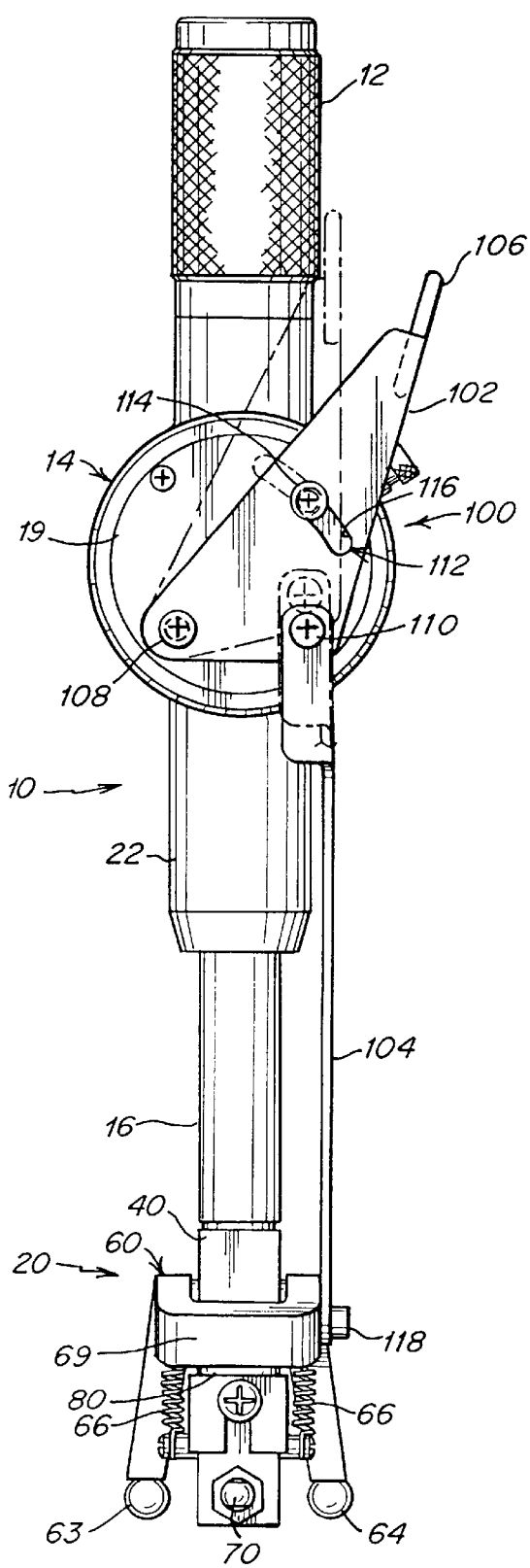
FIG. 8 is a front, elevation view of an alternative embodiment of the bore gage of FIG. 1.
Figure 9:
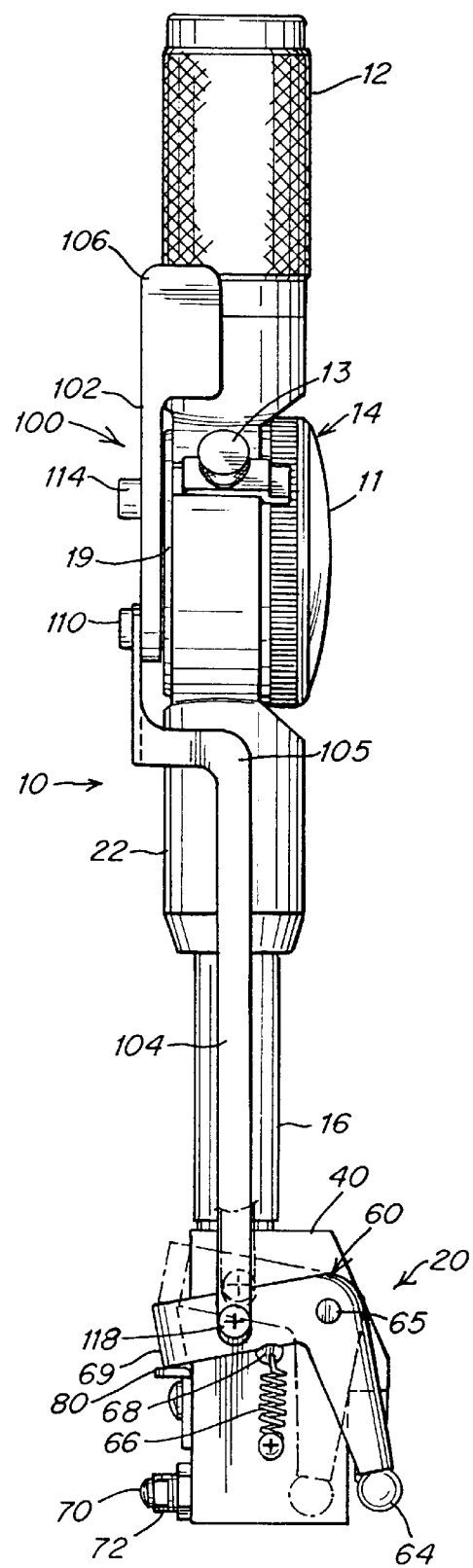
FIG. 9 is a side, elevation view of the bore gage of FIG. 8.

It will be appreciated that springs 66 return lever 102 to the position shown in solid in FIG. 8 upon release of lever 102, while pressure applied by a finger, a thumb or the like operates against the bias provided by springs 66 to push lever into the position shown in dashed lines in FIG. 8 to retract contacts 63 and 64 to the position shown in FIG. 9 in dashed lines.

The operation of bore gage 10 will now be described with particular reference to FIGS. 3–6. Gaging is performed by comparing a diameter of a bore with a master ring 125 (FIG. 6) of known size and tolerance. Initially, a threaded member 72 and associated reference contact 70 are selected for the bore size to be measured. The greater the size of the bore to be measured, the longer is threaded member 72. Member 72 with associated contact 70 is screwed into hole 76 in housing 40 the proper distance. Threaded member 72 should be screwed into hole 76 far enough to permit easy entrance into the master ring 125, while keeping lock nut 74 loose, as shown in FIG. 6. Thereafter, gage 10 is rocked in ring 125 to obtain the proper adjustment of member 72. Member 72 is screwed in or out until the maximum movement of hand 15 covers at least the required tolerance on the positive side of the work. In most instances, one half a revolution of hand 15 is convenient. Once the proper position of member 72 has been determined, lock nut 74 is tightened. Thereafter, bezel 8 is rotated, so that the zero line is at the extreme position for hand 15, or at a point of reverse for hand 15, which is determined while rocking gage 10 in master ring 125.

Thereafter, as illustrated in FIG. 4, gage 10 is inserted into a bore 90. If the embodiment of FIGS. 8 and 9 is utilized, the operator grasps gage 10 and applies manual pressure on lever 102 in a counterclockwise direction, as shown in FIG. 8 to pivot mechanism 60 about pivot pin 65 in a clockwise direction, as shown in FIG. 2, to cause retraction of contacts 63 and 64 toward housing 40. In this way, damage to contacts 63 and 64 and to the interior of bore 90 is minimized. Once head 20 is within the bore 90, the operator releases manual pressure on lever 102 to allow mechanisms 66 to return lever 102 in a clockwise direction, as shown in FIG. 8, until contacts 63 and 64 engage the interior surface of bore 90. If no mechanism 100 is provided, contacts 63 and 64 retract simply as a result of the diametrically directed force applied to them by the interior surface of bore 90 as gage 10 is inserted into the bore. Springs 66 maintain firm contact between contacts 63 and 64 and the interior surface of bore 90. As discussed, contacts 63 and 64 center head 20 within the bore.

Mechanism 50 pivots in a clockwise direction, as shown in FIGS. 1 and 2, as contact 52 engages the interior surface of bore 90. The clockwise pivoting motion of mechanism 50 raises arm 53 upwardly toward unit 14. This upward movement is transferred from transfer contact 56 to the lower end 21 of extension plunger 18, axially raising extension plunger 18 within extension housing 16 against the bias of spring 34, as shown by the arrow in FIG. 2. In other words, the horizontal movement of contact 52 toward housing 40 is transferred into vertical movement of contact 56 which in turn raises plunger 18. This axial movement of plunger 18 is in turn transferred to contact point 30 which, as discussed, is mechanically coupled to hand 15, causing a corresponding movement of hand 15 with respect to surface 11, which is indicative of the bore diameter as compared with that of ring 125. This operation may be repeated to check the bore at several different locations. Also, gage 10 may be rotated within the bore to check the measurement with respect to different diametric directions. Thereafter, gage 10 is removed and the operation is repeated with another bore.

The above-described bore gage provides all of the accuracy of prior art bore gages and may utilize an existing unit 14 which is coupled to extension plunger 18. However, the bore gage of the present invention overcomes some of the shortcomings of prior art bore gages, including damage and reduced performance due to coolant, grit or chips left in the cylinder bore which work their way into the mechanisms of the bore gage. In the present invention, the provision of cutouts 45 allows lower end 21 and transfer contact 56 to be easily cleaned using solvents or pressurized air or the like without the need to disassemble the bore gage or to replace head 20. Similarly, bushing 24 is disposed sufficiently distant from lower end 21 of extension plunger 18 that any grit, coolant, chips or the like left in the bore 90 are unlikely to work their way into the bushing. As a result, there is little likelihood that such debris would cause binding of or damage to extension plunger 18. In addition, contacts 63 and 64, pivot mechanism 60 and springs 66 are all disposed externally of housing 40 and can be readily cleaned, repaired or replaced and are not susceptible of binding, as in prior art mechanisms. The same is also true for sensitive contact 52, which is disposed on an exposed, easily cleaned lever mechanism 50, as opposed to the prior art plunger mechanism. The fewer number of moving parts and the greater simplicity of the present bore gage provides identical accuracy, fewer maintenance problems and greater reliability. Finally, unit 14 is readily separated from extension housing 16 by the release of set screw 38, and extension housing 16 is readily removable from head 20 by the release of set screw 43. In this manner, should it be necessary to clean the internal portions of the bore gage, or replace broken or defective parts, this operation may be achieved quite rapidly. Unit 14, extension housing 16 and head 20 may all be again quickly reassembled by reinsertion of respective set screws 38 and 43. The particular structure and the provision of the associated recesses 39 and 41 produces the proper orientation and location of all components of the bore gage with respect to the other components so that accuracy is assured.

In view of the above description, it is likely that modifications and improvements will occur to those skilled in the art which are within the scope of this invention. The above description is intended to be exemplary only, the scope of the invention being defined by the following claims and their equivalents.

What is claimed is:

1. A gage for a bore, said gage comprising:
   an indicator unit;
   a head;
   a linkage operatively connecting said head to said indicator unit;
   a reference contact disposed on said head;
   a lever mechanism having a first arm with a distal end and a second arm with a distal end, said lever mechanism being pivotally mounted to said head at a position intermediate the distal ends of said first and second arms;
   a first contact disposed on the distal end of said first arm of said lever mechanism, said contact being moveable toward and away from said reference contact upon pivoting of said lever mechanism;
   a second contact disposed on the distal end of said second arm for engaging said linkage to cause movement of said linkage in response to pivoting of said lever mechanism;
   a pivot mechanism having a first arm and a second arm, said first and second arms of said pivot mechanism being disposed on opposite sides of said first contact on said lever mechanism and being pivotable about a common axis on said head, said pivot mechanism having a centralizing contact on a distal end of each of said first and second arms for centralizing said head in a bore to be measured; and
   a member connecting said first and second arms of said pivot mechanism and extending around said head on a side thereof opposite said first contact on said lever mechanism.

2. The gage as recited in claim 1 further comprising a cutout in said head for providing access to said second contact disposed on said lever mechanism to permit cleaning thereof.

3. The gage as recited in claim 1 further comprising:
   a housing surrounding said linkage; and
   a bushing disposed within said housing and being spaced from said head for guiding said linkage.

4. The gage as recited in claim 1 further comprising a manually operated lever for pivoting said pivot mechanism to retract said centralizing contacts toward said head.

5. The gage as recited in claim 1 wherein said linkage is disposed within a housing, and wherein said housing is releasably coupled to said head with a set screw.

6. The gage as recited in claim 5 wherein said housing is removably coupled to said indicator unit by a set screw.

7. The gage as recited in claim 1 further comprising a stop for limiting pivoting motion of said lever mechanism.

8. The gage as recited in claim 7 wherein said stop is adjustable.

9. The gage as recited in claim 8 wherein said stop comprises a set screw.

10. The gage as recited in claim 1, further comprising a biasing mechanism attached to said member at a point spaced from said common axis of said first and second arms of said pivot mechanism for urging said contacts on said first and second arms of said pivot mechanism away from said head.

11. The gage as recited in claim 10 wherein said biasing mechanism comprises at east one spring.

12. The gage as recited in claim 10 further comprising a stop disposed on said head for limiting movement of said pivot mechanism about the common axis.

13. The gage as recited in claim 12 wherein said stop engages said member.

14. The gage as recited in claim 12 wherein said stop is adjustable.

15. A gage for a bore, said gage comprising:

an indicator unit for providing an indication of a bore size;

a gaging head;

linkage for transferring motion in said head to said indicator unit;

a pivotally mounted lever for transferring motion of a contact thereon generally toward and away from said head into motion of said linkage with respect to said indicator unit;

first and second arms mounted on said head to pivot about a common axis, said contact on said lever being disposed between contacts disposed on distal ends of said first and said second arms; and a member coupling said first arm and said second arm, said member extending around said head on a side thereof opposite said contact on said lever and being spaced from said head to permit pivotal movement of said first and second arms with respect to said head.

16. The gage as claimed in claim 15, further comprising a stop disposed on said head for engaging said member and for limiting pivotal movement of said first and second arms about their common pivot axis.

17. The gage as claimed in claim 15, further comprising an extension housing surrounding said linkage, and wherein the extension housing includes a cutout extending lengthwise along the extension housing, and the head includes a corresponding protrusion, permitting positive location of the head with respect to the extension housing.

18. The gage as claimed in claim 15, further comprising an extension housing surrounding said linkage, and wherein the head is attached to the housing with a single set screw.

19. The gage as claimed in claim 15, further comprising an extension housing surrounding said linkage, and wherein the indicator unit is attached to the housing with a single set screw.

20. A gage for a bore, said gage comprising:

an indicator unit providing an indication of a bore size;

a head;

a linkage connecting the head to the indicator unit;

a lever mechanism for transferring motion of a contact thereon generally toward and away from the head into motion of the linkage toward and away from the indicator unit; and first and second centralizers attached to the head, the contact on the lever mechanism being disposed between contacts disposed on distal ends of the centralizers;

wherein the lever mechanism and the first and second centralizers are spaced from the head to permit cleaning access to the entire head, the entire lever mechanism, and the entire first and second centralizers without disassembly.

21. The gage as claimed in claim 20, wherein the head further comprises a cutout, the cutout allowing access within the head to the linkage for cleaning.

\* \* \* \* \*